United States Patent
Hong et al.

(10) Patent No.: US 11,172,490 B2
(45) Date of Patent: Nov. 9, 2021

(54) APPARATUS FOR CONSTRUCTING ENERGY-EFFICIENT COMMUNICATION AND COMPUTATION RESOURCE ALLOCATION FRAMEWORK FOR MULTIPLE COMMUNICATION SERVICE AND METHOD THEREOF

(71) Applicant: UNIVERSITY-INDUSTRY COOPERATION GROUP OF KYUNG HEE UNIVERSITY, Yongin-si (KR)

(72) Inventors: Choong Seon Hong, Yongin-si (KR); Kyaw Tun Yan, Yongin-si (KR); Seok Won Kang, Yongin-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 17/006,148

(22) Filed: Aug. 28, 2020

(65) Prior Publication Data

US 2021/0160888 A1    May 27, 2021

(30) Foreign Application Priority Data

Nov. 25, 2019  (KR) .......................... 10-2019-0152521
Aug. 28, 2020  (KR) .......................... 10-2020-0109437

(51) Int. Cl.
*H04W 72/04*   (2009.01)
*H04W 72/08*   (2009.01)
*H04W 28/02*   (2009.01)
*H04W 28/08*   (2009.01)
*H04L 1/00*    (2006.01)

(52) U.S. Cl.
CPC ......... *H04W 72/085* (2013.01); *H04L 1/0013* (2013.01); *H04W 28/0268* (2013.01); *H04W 28/08* (2013.01); *H04W 72/048* (2013.01)

(58) Field of Classification Search
CPC .............................. H04W 72/04; H04W 72/12
See application file for complete search history.

(56) References Cited

U.S. PATENT DOCUMENTS

| | | | | |
|---|---|---|---|---|
| 10,097,260 B2 * | 10/2018 | Hosseini | ................. | H04B 7/26 |
| 10,200,140 B2 * | 2/2019 | Li | ......................... | H04J 11/005 |
| 10,892,860 B2 * | 1/2021 | Wang | ...................... | H04L 1/189 |
| 2018/0262311 A1 | 9/2018 | Wang et al. | | |

FOREIGN PATENT DOCUMENTS

| | | |
|---|---|---|
| KR | 10-2018-0132871 A | 12/2018 |
| KR | 10-2019-0121297 A | 10/2019 |

* cited by examiner

*Primary Examiner* — Michael T Vu
(74) *Attorney, Agent, or Firm* — Sughrue Mion, PLLC

(57) ABSTRACT

Disclosed is a technical idea of constructing energy-efficient communication and computation resource allocation framework for Enhanced Mobile Broadband (eMBB) and Ultra-Reliable Low-Latency Communication (URLLC) in 5G or higher networks. More particularly, the present disclosure relates to a technology of constructing social block coordinate descent (BCD)-based energy-efficient communication and computation resource allocation framework to address optimization problems related to restriction of eMBB users, reliability of URLLC traffic, and resource block allocation for eMBB user restriction.

14 Claims, 3 Drawing Sheets

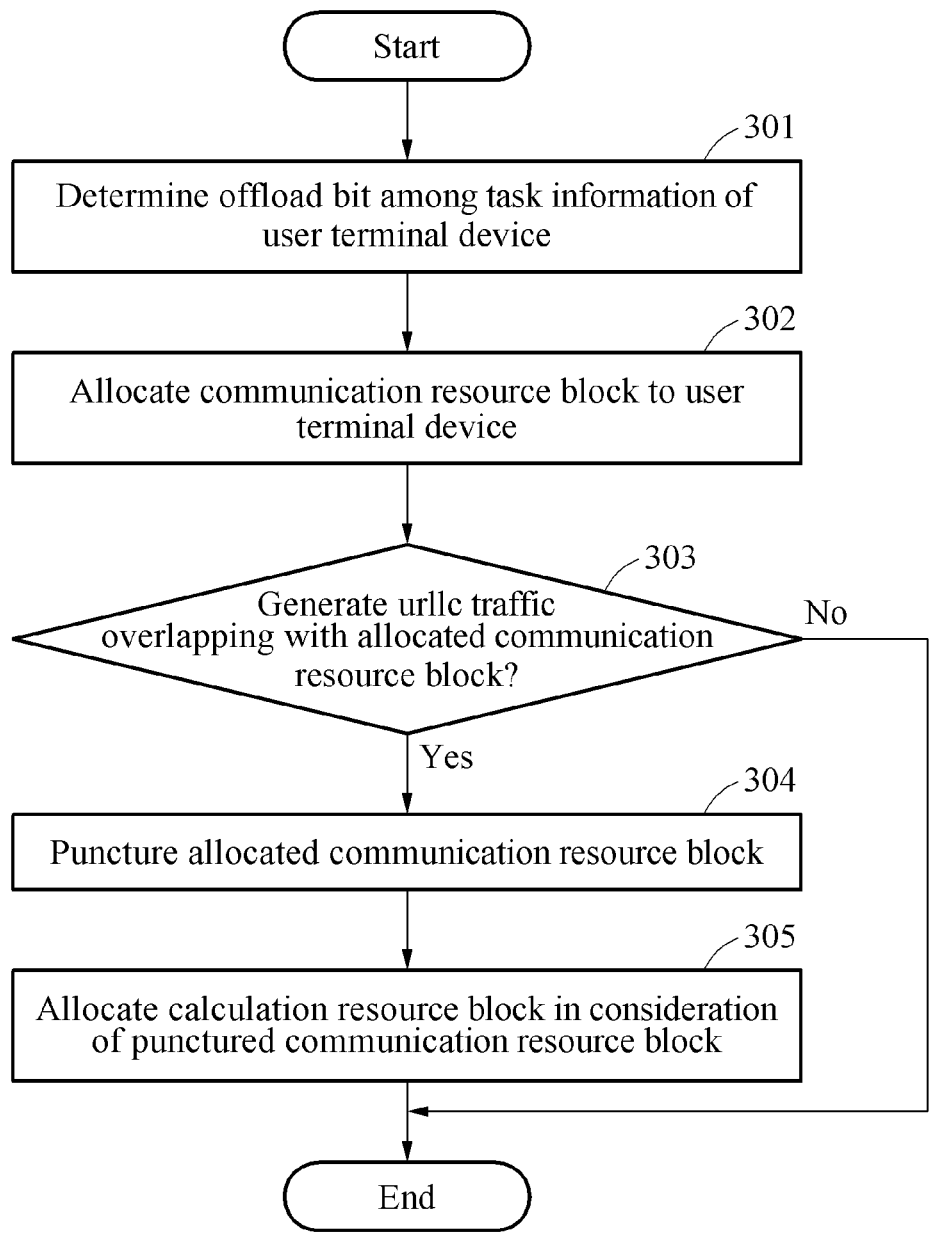

APPARATUS FOR CONSTRUCTING ENERGY-EFFICIENT COMMUNICATION AND COMPUTATION RESOURCE ALLOCATION FRAMEWORK FOR MULTIPLE COMMUNICATION SERVICE AND METHOD THEREOF

CROSS-REFERENCE TO RELATED APPLICATIONS

This application claims priority to Korean Patent Application No. 10-2019-0152521, filed on Nov. 25, 2019, and Korean Patent Application No. 10-2020-0109437, filed on Aug. 28, 2020, in the Korean Intellectual Property Office, the disclosure of which is incorporated herein by reference.

BACKGROUND OF THE DISCLOSURE

Field of the Disclosure

The present disclosure relates to a technical idea of constructing energy-efficient communication and computation resource allocation framework for multiple communication services, and more particularly, to a technical idea of constructing energy-efficient communication and computation resource allocation framework for Enhanced Mobile Broadband (eMBB) and Ultra-Reliable Low-Latency Communication (URLLC) in 5G or higher networks.

Description of the Related Art

With the explosion of urban Internet of Things (IoT) devices, computationally intensive applications such as Augmented Reality (AR), facial recognition, Virtual Reality (VR), online gaming, and traffic monitoring are becoming essential for daily activities.

However, the computational capacities of IoT devices (e.g. CPU capacity) and battery life are limited, so there are problems regarding data processing of local devices.

As one solution for solving the problems, mobile cloud computing (MCC) is attracting attention.

In MCC, computationally intensive tasks are offloaded to a cloud server through a cellular network, thereby reducing energy consumption of resource-limited devices.

A cloud server runs an offloaded task and sends a resultant output to a device again.

However, cloud servers are far from mobile devices, which may greatly increase delay phenomena experienced in services of the devices.

Recently, the wireless communications industry and the academic research community have introduced a new technology called Multi-access Edge Computing (MEC).

In MEC, servers may be deployed at edges, e.g., small cells, macro base stations, relay stations and access points, of a radio access network and may provide computational services to mobile devices.

Compared to mobile computing, computing resources in MEC are closer to a mobile device than a cloud server, thereby being capable of reducing latency in the mobile device.

In particular, the compute capacity of an MEC server is limited when compared to that of a cloud server. Accordingly, efficient resource allocation is required in an MEC system.

To address such problems, several research studies currently underway are discussing an efficient computationally-intensive task offload and resource allocation algorithm of MEC.

According to the latest release of 3GPP, multiple communication services such as Enhanced Mobile Broadband (eMBB), Mass Machine Type Communications (mMTC) and Ultra-Reliable Low-Latency Communication (URLLC) are planned to be provided for 5G services.

In summary, the eMBB service is an advanced form of existing mobile broadband services with current LTE network requiring higher throughput for delay-sensitive applications.

URLLC is a new service for application programs requiring high reliability and low latency as in autonomous vehicles, industrial vehicles and telesurgery, while mMTC is a service for IoT devices as in smart cities.

New wireless services are available in 5G, but challenges remain. One example thereof is to schedule services with different Quality of Service (QoS) requirements in existing cellular networks.

In all existing tasks, the efficient task offload and computation resource allocation mechanism of the MEC system and the individual scheduling of eMBB and URLLC traffic are being discussed.

However, eMBB users need high computational services due to limited computing capacity (e.g. CPU resources) and battery life, so the two research issues may be addressed in combination.

REFERENCES

Patent document 1: U.S. patent Ser. No. 10/097,260 entitled "CURRENT INDICATION CHANNEL FOR EMBB/URLLC MULTIPLEXING"

Patent document 2: Korean Patent Application Publication No. 10-2019-0121297 entitled "INTERFERENCE REDUCTION FOR REFERENCE SYMBOLS IN URLLC/EMBB MULTIPLEXING"

Patent document 3: US Patent Application Publication No. 2018/0262311 entitled "ULTRA-RELIABLE LOW-LATENCY COMMUNICATION INDICATION CHANNELIZATION DESIGNS"

Patent document 4: Korean Patent Application Publication No. 10-2018-0132871 entitled "DYNAMIC FRAME STRUCTURE FOR AN ENHANCED CELLULAR NETWORK"

SUMMARY OF THE DISCLOSURE

Therefore, the present disclosure has been made in view of the above problems, and it is an object of the present disclosure to introduce an energy-efficient resource allocation framework for enhanced mobile broadband (eMBB) and Ultra-Reliable Low-Latency Communication (URLLC) traffic beyond 5G or higher networks It is another object of the present invention to construct social block coordinate descent (BCD)-based energy-efficient communication and computation resource allocation framework to address optimization problems related to restriction of eMBB users, reliability of URLLC traffic, and resource block allocation for eMBB user restriction.

It is another object of the present disclosure to minimize energy consumption according to latency of an eMBB user, a central processor (CPU) capacity of an MEC server, and maximum transmission power, and to schedule eMBB and URLLC traffic problems together with efficient collaborative task offload to maximize an achievable data rate of the eMBB user.

It is still another object of the present disclosure to energy-efficiently provide computational services to different mobile users having different QoS requirements, such as high reliability and low latency, in a shared infrastructure and provide a framework for coexistence of the mobile users.

It is yet another object of the present disclosure to support a mobile operator to improve a network capacity and to efficiently manage a network resource and to increase network profits of a mobile operator.

In accordance with an aspect of the present invention, the above and other objects can be accomplished by the provision of a macro base station configured to use a Mobile Edge Computing (MEC) server and construct energy-efficient communication and computation resource allocation framework for multiple communication services, the macro base station including: an offload determiner configured to determine, according to task information of a plurality of user terminal devices, an offload bit among input data sizes of the task information; a resource block allocator configured to allocate a communication resource block to the plurality of user terminal devices based on the determined offload bit; a resource block puncturer configured to puncture the allocated communication resource block when Ultra-Reliable Low-Latency Communication (URLLC) traffic overlaps the allocated communication resource block; and a computation resource allocator configured to calculate a calculation resource block to process an offload bit additionally determined in relation to the punctured communication resource block, and allocate the calculated calculation resource block to the MEC server so as to process the determined offload bit and the additionally determined offload bit.

The macro base station according to an embodiment of the present disclosure may further include an information collector configured to collect at least one of Channel State Information (CSI) related to the task information, central processor operation period information and task delay limit information for processing one bit of data among the input data sizes and central processor capacity information from the plurality of user terminal devices.

The offload determiner may determine an offload bit among input data sizes of the task information based on at least one of CSI related to the task information, central processor operation period information and task delay limit information for processing one bit of data among the input data sizes and central processor capacity information.

The resource block puncturer may puncture the allocated communication resource block in consideration of a weight vector of the URLLC traffic and a data transmission rate of the plurality of user terminal devices.

The resource block puncturer may capture a last data rate of the plurality of user terminal devices to consider the data transmission rate of the plurality of user terminal devices.

The resource block puncturer may first allocate the punctured communication resource block to the URLLC traffic, and may set zero transmit power of a user terminal device, which is related to the punctured communication resource block, among the plurality of user terminal devices.

The plurality of user terminal devices may include at least one terminal device of an enhanced Mobile Broadband (eMBB) user terminal device and a URLLC user terminal device.

The URLLC user terminal device may generate the URLLC traffic on the communication resource block allocated to the eMBB user terminal device.

The eMBB user terminal device may divisionally execute, with regard to the task information, local computing of locally processing an input data size of the task information and remote computing of remotely processing the determined offload bit in the MEC server.

The resource allocator may calculate a communication resource block to be processed with the local computing in consideration of at least one of a total data size of the input data, a total CPU operation period, an execution time of a user terminal device for calculating one bit and the determined offload bit, and may allocate the calculated communication resource block to at least one of the plurality of user terminal devices.

The resource allocator may allocate the communication resource block for processing remaining input data, except for the determined offload bit, among the input data to at least one of the plurality of user terminal devices.

The MEC server may process the determined offload bit and the additionally determined offload bit using the allocated calculation resource block to secure quality of service (QoS) of the plurality of user terminal devices.

In accordance with another aspect of the present invention, there is provided a method of operating a macro base station, the method using a Mobile Edge Computing (MEC) server and constructing energy-efficient communication and computation resource allocation framework for multiple communication services, the method including: determining, according to task information of a plurality of user terminal devices, an offload bit among input data sizes of the task information by an offload determiner; allocating a communication resource block to the plurality of user terminal devices based on the determined offload bit by a resource block allocator; puncturing the allocated communication resource block by a resource block puncturer when Ultra-Reliable Low-Latency Communication (URLLC) traffic overlaps the allocated communication resource block; and calculating a calculation resource block for processing an offload bit additionally determined in relation to the punctured communication resource block, and allocating the calculated calculation resource block to the MEC server so as to process the determined offload bit and the additionally determined offload bit, by a computation resource allocator.

The operation method of the macro base station according to an embodiment of the present disclosure may further include collecting at least one of Channel State Information (CSI) related to the task information, central processor operation period information and task delay limit information for processing one bit of data among the input data sizes, and central processor capacity information from the plurality of user terminal devices by an information collector.

BRIEF DESCRIPTION OF THE DRAWINGS

The above and other objects, features and other advantages of the present disclosure will be more clearly understood from the following detailed description taken in conjunction with the accompanying drawings, in which:

FIG. 3 illustrates an operation method of a macro base station according to an embodiment of the present disclosure.

DETAILED DESCRIPTION OF THE DISCLOSURE

Figure 1:
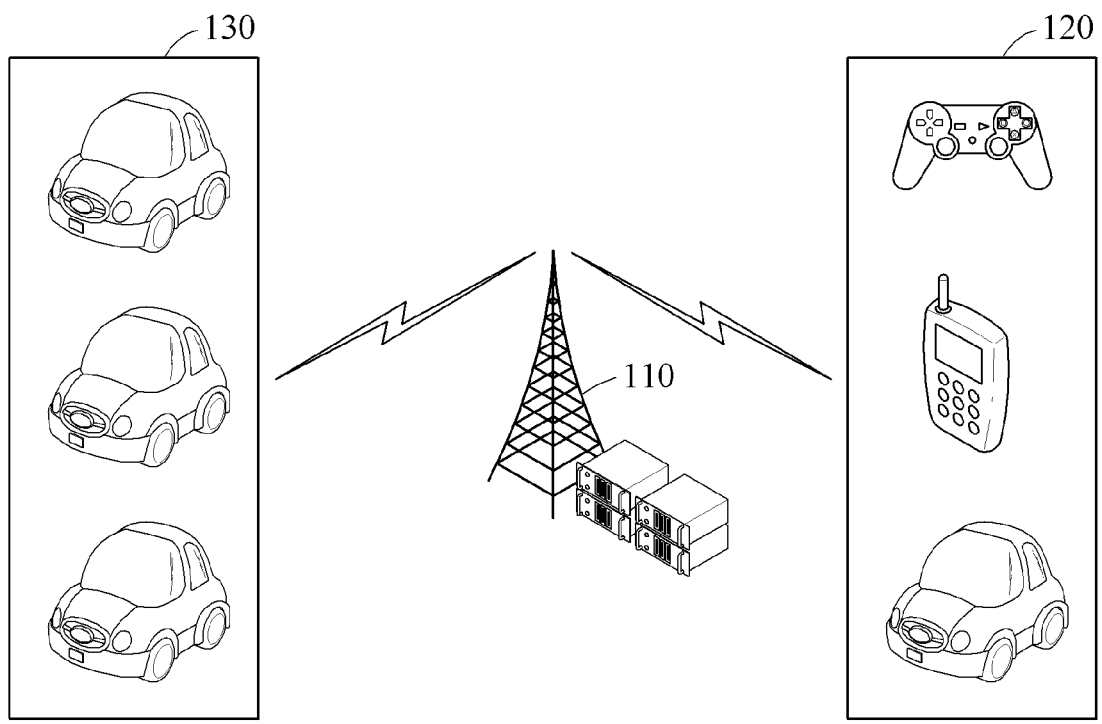
FIG. 1 illustrates a framework construction system for constructing energy-efficient communication and computation resource allocation framework for multiple communication services according to an embodiment of the present disclosure.

Specific structural and functional descriptions of embodiments according to the concept of the present disclosure disclosed herein are merely illustrative for the purpose of explaining the embodiments according to the concept of the present disclosure. Furthermore, the embodiments according to the concept of the present disclosure can be implemented in various forms and the present disclosure is not limited to the embodiments described herein.

The embodiments according to the concept of the present disclosure may be implemented in various forms as various modifications may be made. The embodiments will be described in detail herein with reference to the drawings. However, it should be understood that the present disclosure is not limited to the embodiments according to the concept of the present disclosure, but includes changes, equivalents, or alternatives falling within the spirit and scope of the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the scope of rights according to the concept of the present invention.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" in the specification should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments of the invention are shown. This disclosure may, however, be embodied in many different forms and should not be construed as limited to the exemplary embodiments set forth herein. Like reference numerals in the drawings denote like elements.

FIG. 1 illustrates a framework construction system for constructing energy-efficient communication and computation resource allocation framework for multiple communication services according to an embodiment of the present disclosure.

Referring to FIG. 1, a framework construction system 100 includes a macro base station 110, at least one eMBB user terminal device 120 and at least one URLLC user terminal device 130, wherein the macro base station 110 uses a Mobile Edge Computing (MEC) sever.

The macro base station 110 according to an embodiment of the present disclosure uses a full bandwidth F, and the at least one eMBB user terminal device 120 uses a first bandwidth Fb included in a system bandwidth F.

Meanwhile, the at least one URLLC user terminal device 130 uses a second bandwidth Fs, except for the first bandwidth Fb, in the system bandwidth F. Here, the first bandwidth Fb is orthogonally sliced into a static part with the second bandwidth Fs, so that problems may occur in distributing the second bandwidth Fs for service to the at least one URLLC user terminal device 130.

Accordingly, the macro base station 110 punctures a communication resource block allocated to the at least one eMBB user terminal device 120 to guarantee the quality of service (QoS) requirements of each eMBB user terminal device 120.

For example, the first bandwidth Fb used in the at least one eMBB user terminal device 120 divisionally uses the system bandwidth F, and a duration of a communication resource block corresponding to the first bandwidth Fb may be 1 millisecond.

The macro base station 110 according to an embodiment of the present disclosure considers the scenario in which the at least one eMBB user terminal device 120 performs different calculation tasks under different waiting time constraints.

With regard to the at least one eMBB user terminal device 120 in a network provided by the macro base station 110 according to an embodiment of the present disclosure, a total data size of input data, the period of a central processor for processing the total data size, and a maximum allowable waiting time or user task execution time for performing a 1-bit calculation task of task data are considered.

For example, the at least one eMBB user terminal device 120 may locally execute tasks or may offload some of tasks to an MEC server of the macro base station 110.

That is, the macro base station 110 considers a partial work offload scenario divided into local computing and remote computing of the at least one eMBB user terminal device 120.

Energy consumption according to local computing of the at least one eMBB user terminal device 120 according to an embodiment of the present disclosure may be explained through Equations 1 and 2 below.

$$t_u^L = \frac{c_u(d_u - l_u)}{f_u^l}, \forall u \in U \quad [\text{Equation 1}]$$

where $t_u^L$ represents a time taken for an eMBB user terminal device to locally execute some of tasks, $c_\mu$ represents the period of a central processor for data processing, $d_\mu$ represents a total input data size, and $l_\mu$ represents the size of input data to be processed by local computing.

$$E_u^L = k f_u^{l^2} c_u(d_u - l_u), \forall u \in U \quad [\text{Equation 2}]$$

where $t_u^L$ represents energy consumed for an eMBB user terminal device to locally execute some of tasks, $c_\mu$ represents the period of a central processor for data processing, $d_\mu$ represents a total input data size, $l_\mu$ represents the size of input data to be processed by local computing, and $f_u^l$ represents a maximum compute capacity.

The macro base station 110 according to an embodiment of the present disclosure allocates a communication resource block to the at least one eMBB user terminal device 120 when the at least one eMBB user terminal device 120 offloads some of input data of a user to the MEC server.

Here, an uplink transmission time and transmission energy related to a communication resource block allocated by the macro base station 110 may be explained through Equation 3 and 4.

$$t_u^{up} = \frac{l_u}{\sum_{b=1}^{B} y_u^b R_{u,b}}, \forall u \in U \quad \text{[Equation 3]}$$

where $t_u^{up}$ represents an uplink transmission time, $l_\mu$ represents the size of input data to be processed by local computing, $y_u^b$ represents a communication resource block allocation variable, and $R_{\mu,b}$ represents a data rate attainable by an eMBB user terminal device in an allocated communication resource block.

$$E_u^{up} = \sum_{b=1}^{B} P_u^b \frac{l_u}{y_u^b R_{u,b}}, \forall u \in U \quad \text{[Equation 4]}$$

where $E_u^{up}$ represents an uplink transmission energy, $l_\mu$ represents the size of input data to be processed by local computing, $y_u^b$ represents a communication resource block allocation variable, $P_u^b$ represents a proportionality related to a communication resource block, and $R_{\mu,b}$ represents a data rate attainable by an eMBB user terminal device in an allocated communication resource block.

A task execution time for processing offloaded input data of the at least one eMBB user terminal device 120 according to an embodiment of the present disclosure may be defined by Equation 5 below.

$$t_u^{re} = \frac{c_u l_u}{f_u^C} \quad \text{[Equation 5]}$$

where $t_u^{re}$ represents a task execution time for processing offloaded input data of an eMBB user terminal device, $l_\mu$ represents the size of input data to be processed by local computing, $c_\mu$ represents the period of a central processor for data processing, and $f_u^C$ represents the capacity of a central processor allocated to an MEC server to process an offloaded task of the eMBB user terminal device.

For example, a processing time for remote calculation of the eMBB user terminal device may be the sum of a value derived by Equation 3 and a time derived by Equation 3.

In accordance with an embodiment of the present disclosure, the at least one URLLC user terminal device 130 may generate URLLC traffic. Here, the URLLC traffic may correspond to a case that occurs in a communication resource block allocated to the eMBB user terminal device.

Here, the URLLC traffic may represent short packet transmission due to high stability and very low latency.

URLLC traffic has strict latency requirements, so it cannot be deferred to a next-time slot.

Accordingly, arriving URLLC traffic may be transmitted to a next mini-slot and scheduled with zero transmit power for an overlapped eMBB user terminal device 120.

When Lm is regarded as a variable representing URLLC traffic coming from a mini-slot denoted by m, Lm may be expressed as a Bernoulli distribution having a success probability of p. Here, the success probability, p, may represent the possibility of URLLC transmission in the mini slot.

The purpose of a URLLC scheduler is to obtain a URLLC placement weight vector to reserve the arriving URLLC traffic while considering the reliability of transmission to the eMBB user terminal device 120.

Calculating the URLLC placement weight vector based on a formulation that aims to maximize the total average data rate of the eMBB user terminal device 120 may protect the eMBB user terminal device 120 with a high data transmission rate while not impacting the eMBB user terminal device 120 with a low data transmission rate.

Accordingly, the macro base station 110 may consider the risk on transmission of the eMBB user terminal device 120 in the URLLC scheduler so as to protect the eMBB user terminal device 120 with a low data transmission rate.

That is, in the macro base station 110, a URLLC traffic distribution among the eMBB user terminal device 120 by a URLLC placement weight, w*, considers the eMBB user terminal device 120 with bad channel conditions.

Accordingly, energy-efficient communication and computation resource allocation framework are arranged in the macro base station 110, thereby being capable of efficiently managing resource allocation.

In addition, the macro base station 110 may also determine the amount of communication resource blocks to be punctured from each eMBB user terminal device 120 when URLLC traffic arrives.

Figure 2:
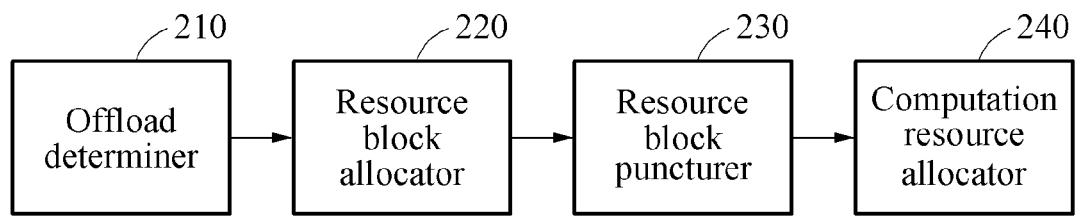
FIG. 2 illustrates components of a macro base station according to an embodiment of the present disclosure.

FIG. 2 illustrates components of a macro base station according to an embodiment of the present disclosure.

FIG. 2 illustrates components of a macro base station that uses the MEC server according to an embodiment of the present disclosure and aims to construct energy-efficient communication and computation resource allocation framework for multiple communication services.

Referring to FIG. 2, a macro base station 200 according to an embodiment of the present disclosure includes an offload determiner 210, a resource block allocator 220, a resource block puncturer 230 and a computation resource allocator 240.

The macro base station 200 according to an embodiment of the present disclosure includes an MEC server, and may process offload bits of a plurality of user terminal devices using the MEC server.

For example, the offload determiner 210 may determine an offload bit among input data sizes of task information according to task information of the plurality of user terminal devices.

In accordance with an embodiment of the present disclosure, the offload determiner 210 may determine an offload bit among input data sizes of the task information based on at least one of CSI related to the task information, central processor operation period information and task delay limit information for processing one bit of data among the input data sizes and central processor capacity information.

Here, the central processor is a central processor of each of the plurality of user terminal devices and may be a processor used to process task information-related input data by the plurality of user terminal devices.

For example, although offload bits are bits processed by a user terminal device, the offload bits may correspond to bits processed in the MEC server instead.

In accordance with an embodiment of the present disclosure, the offload determiner 210 may determine offload bits, which bits of an input data size of a task should be offloaded to the MEC server, so as to minimize energy consumption of a network according to task information of each eMBB user terminal device such as an input data size of a task, a CPU cycle required for processing 1-bit data, delay limit of a task, and a total CPU capacity of a user.

In accordance with an embodiment of the present disclosure, the resource block allocator 220 may allocate communication resource blocks to the plurality of user terminal devices based on an offload bit determined by the offload determiner 210.

For example, the resource block allocator 220 may calculate a communication resource block for processing by local computing in consideration of at least one of a total data size of input data, a total CPU operation period, an execution time of a user terminal device for calculating one bit and an offload bit and may allocate the calculated communication resource block to at least one of the plurality of user terminal devices.

In accordance with an embodiment of the present disclosure, the resource block allocator 220 may allocate a communication resource block for processing remaining input data, except for the determined offload bit, among input data to at least one of the plurality of user terminal devices.

For example, the plurality of user terminal devices may include at least one terminal device of an eMBB user terminal device and an Ultra-Reliable Low-Latency Communication (URLLC) user terminal device.

In accordance with an embodiment of the present disclosure, the URLLC user terminal device may generate URLLC traffic on the communication resource block allocated to the eMBB user terminal device.

For example, the eMBB user terminal device may divisionally execute, with regard to the task information, local computing of locally processing an input data size of the task information and remote computing of remotely processing the determined offload bit in the MEC server.

In accordance with an embodiment of the present disclosure, the macro base station 200 may further include an information collector (not shown).

For example, the information collector (not shown) may collect at least one of task information-related CSI, central processor operation period information and task delay limit information for processing one bit of data among input data sizes and central processor capacity information from the plurality of user terminal devices.

In accordance with an embodiment of the present disclosure, the resource block allocator 220 may determine such that BS allocates the number of resource blocks to each eMBB user after offloading an offloaded data size of the eMBB user to the MEC server.

Here, it may be different depending upon the number of factors such as channel gain, an offloaded data size and a latency constraint condition of each user.

In accordance with an embodiment of the present disclosure, the resource block puncturer 230 may puncture an allocated communication resource block when URLLC traffic overlaps a communication resource block allocated in a user terminal device of any one of the plurality of user terminal devices.

For example, the resource block puncturer 230 may puncture an allocated communication resource block in consideration of a weight vector of URLLC traffic and a data transmission rate of the plurality of user terminal devices.

In addition, the resource block puncturer 230 may capture the last data rate of the plurality of user terminal devices to consider a data transmission rate of the plurality of user terminal devices.

For example, URLLC traffic may occur within a time already allocated to an eMBB user.

Here, since URLLC traffic performs short packet transmission due to high stability and very low latency, latency requirements are strict. Accordingly, URLLC traffic cannot be postponed to a next time slot.

Accordingly, destination URLLC traffic may be scheduled for transmission at the next URL, and the destination URLLC traffic can be scheduled next time to perform zero transmission power for mini-slot and an overlapped eMBB user terminal device.

For example, the zero transmission power may represent scheduling communication resource allocation to converge power consumed by the eMBB user terminal device for transmission onto zero.

That is, the resource block puncturer 230 may first allocate a punctured communication resource block to URLLC traffic and may set zero transmit power of a user terminal device, which is related to the punctured communication resource block, among the plurality of user terminal devices.

Accordingly, the present disclosure can minimize energy consumption according to latency of an eMBB user, a central processor (CPU) capacity of an MEC server, and maximum transmission power, and can schedule eMBB and URLLC traffic problems together with efficient collaborative task offload to maximize an achievable data rate of the eMBB user.

In accordance with an embodiment of the present disclosure, the computation resource allocator 240 may also be referred to as a computing resource allocator.

For example, the computation resource allocator 240 may calculate a calculation resource block to process an additionally determined offload bit in relation to a punctured communication resource block and may allocate a calculation resource block to the MEC server to process a determined offload bit and an additionally determined offload bit.

In accordance with an embodiment of the present disclosure, the computation resource allocator 240 may allocate a compute capacity (e.g., CPU capacity) to respective offloaded tasks to the MEC server when all of offloaded tasks of an eMBB user arrive at the server of the base station.

Here, the computation resource allocator 240 may consider a weight-proportional allocation-based computation resource allocation system.

In accordance with an embodiment of the present disclosure, the MEC server may process a determined offload bit and an additionally determined offload bit using the allocated calculation resource block, thereby securing quality of service (QoS) of the plurality of user terminal devices.

Accordingly, the present disclosure can introduce an energy-efficient resource allocation framework for eMBB and URLLC traffic beyond 5G or higher networks.

In addition, the present disclosure can construct social block coordinate descent (BCD)-based energy-efficient communication and computation resource allocation framework to address optimization problems related to restriction of eMBB users, reliability of URLLC traffic, and resource block allocation for eMBB user restriction.

FIG. 3 illustrates an operation method of a macro base station according to an embodiment of the present disclosure.

FIG. 3 illustrates an embodiment of an operation method of a macro base station according to an embodiment of the present disclosure using an MEC server to construct energy-efficient communication and computation resource allocation framework for multiple communication services.

Referring to FIG. 3, in step 301 of the operation method of the macro base station according to an embodiment of the present disclosure, an offload bit among task information of a user terminal device is determined.

That is, in the operation method of the macro base station, an offload bit among input data sizes of task information may be determined according to task information of the plurality of user terminal devices.

Here, in the operation method of the macro base station, an offload bit among input data sizes of task information may be determined based on at least one of task information-related CSI, central processor operation period information and task delay limit information for processing one bit of data among input data sizes and central processor capacity information.

In step 302 of the operation method of the macro base station according to an embodiment of the present disclosure, a communication resource block is allocated to a user terminal device.

That is, a communication resource block is allocated to each of the plurality of user terminal devices based on the offload bit determined in step 301 of the operation method of the macro base station according to an embodiment of the present disclosure.

Here, in the operation method of the macro base station, each of the plurality of user terminal devices calculates a communication resource block to be processed with local computing in consideration of a total data size of input data, a total CPU operation period, an execution time of a user terminal device for calculating one bit and at least one of the determined offload bit, and the communication resource block is allocated to at least one user terminal device of the plurality of user terminal devices.

In step 303 of the operation method of the macro base station according to an embodiment of the present disclosure, it is determined whether URLLC traffic overlapping with the communication resource block allocated to the plurality of user terminal devices occurs.

In the operation method of the macro base station according to an embodiment of the present disclosure, step 304 is performed when an overlapping problem occurs between the allocated communication resource block and the URLLC traffic, whereas the procedure is terminated when the overlapping problem does not occur.

In step 304 of the operation method of the macro base station according to an embodiment of the present disclosure, the communication resource block allocated in step 302 is punctured.

That is, in the operation method of the macro base station, the communication resource block allocated to the user terminal device using eMBB is punctured so as to schedule the overlapping problem of URLLC traffic.

Accordingly, in the operation method of the macro base station, the punctured communication resource block is first allocated to the URLLC traffic, and zero transmit power of a user terminal device, related to the punctured communication resource block, among the plurality of user terminal devices is set.

In step 305 of the operation method of the macro base station according to an embodiment of the present disclosure, a calculation resource block is allocated in consideration of the communication resource block punctured in step 304.

That is, in the operation method of the macro base station, a calculation resource block for processing an offload bit additionally determined in relation to the punctured communication resource block may be calculated, and a calculation resource block calculated to process the determined offload bit and the additionally determined offload bit may be allocated to the MEC server.

Accordingly, by the operation method of the macro base station, the MEC server may process the determined offload bit and additionally determined offload bit using the calculation resource block allocated to the MEC server itself, thereby securing QoS of the plurality of user terminal devices.

The present disclosure can energy-efficiently provide computational services to different mobile users having different QoS requirements, such as high reliability and low latency, in a shared infrastructure and can provide a framework for coexistence of the mobile users.

In addition, the present disclosure can support a mobile operator to improve a network capacity and to efficiently manage a network resource and can increase network profits of a mobile operator.

As apparent from the above description, the present disclosure can introduce an energy-efficient resource allocation framework for enhanced mobile broadband (eMBB) and Ultra-Reliable Low-Latency Communication (URLLC) traffic beyond 5G or higher networks.

The present disclosure can construct social block coordinate descent (BCD)-based energy-efficient communication and computation resource allocation framework to address optimization problems related to restriction of eMBB users, reliability of URLLC traffic, and resource block allocation for eMBB user restriction.

The present disclosure can minimize energy consumption according to latency of an eMBB user, a central processor (CPU) capacity of an MEC server, and maximum transmission power, and can schedule eMBB and URLLC traffic problems together with efficient collaborative task offload to maximize an achievable data rate of the eMBB user.

The present disclosure can energy-efficiently provide computational services to different mobile users having different QoS requirements, such as high reliability and low latency, in a shared infrastructure and can provide a framework for coexistence of the mobile users.

The present disclosure can support a mobile operator to improve a network capacity and to efficiently manage a network resource and can increase network profits of a mobile operator.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The methods according to the embodiments of the present disclosure may be implemented in the form of a program command that can be executed through various computer means and recorded in a computer-readable medium. The computer-readable medium can store program commands, data files, data structures or combinations thereof. The program commands recorded in the medium may be specially designed and configured for the present disclosure or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

DESCRIPTION OF SYMBOLS

200: macro base station
210: offload determiner
220: resource block allocator
230: resource block puncturer
240: computation resource allocator

What is claimed is:

1. A macro base station configured to use a Mobile Edge Computing (MEC) server and construct energy-efficient communication and computation resource allocation framework for multiple communication services, the macro base station comprising:
   an offload determiner configured to determine, according to task information of a plurality of user terminal devices, an offload bit among input data sizes of the task information;
   a resource block allocator configured to allocate a communication resource block to the plurality of user terminal devices based on the determined offload bit;
   a resource block puncturer configured to puncture the allocated communication resource block when Ultra-Reliable Low-Latency Communication (URLLC) traffic overlaps the allocated communication resource block; and
   a computation resource allocator configured to calculate a calculation resource block to process an offload bit additionally determined in relation to the punctured communication resource block, and allocate the calculated calculation resource block to the MEC server so as to process the determined offload bit and the additionally determined offload bit.

2. The macro base station according to claim 1, further comprising an information collector configured to collect at least one of Channel State Information (CSI) related to the task information, central processor operation period information and task delay limit information for processing one bit of data among the input data sizes and central processor capacity information from the plurality of user terminal devices.

3. The macro base station according to claim 2, wherein the offload determiner determines an offload bit among input data sizes of the task information based on at least one of CSI related to the task information, central processor operation period information and task delay limit information for processing one bit of data among the input data sizes and central processor capacity information.

4. The macro base station according to claim 1, wherein the resource block puncturer punctures the allocated communication resource block in consideration of a weight vector of the URLLC traffic and a data transmission rate of the plurality of user terminal devices.

5. The macro base station according to claim 4, wherein the resource block puncturer captures a last data rate of the plurality of user terminal devices to consider the data transmission rate of the plurality of user terminal devices.

6. The macro base station according to claim 4, wherein the resource block puncturer first allocates the punctured communication resource block to the URLLC traffic, and sets zero transmit power of a user terminal device, which is related to the punctured communication resource block, among the plurality of user terminal devices.

7. The macro base station according to claim 1, wherein the plurality of user terminal devices comprises at least one terminal device of an enhanced Mobile Broadband (eMBB) user terminal device and a URLLC user terminal device.

8. The macro base station according to claim 7, wherein the URLLC user terminal device generates the URLLC traffic on the communication resource block allocated to the eMBB user terminal device.

9. The macro base station according to claim 7, wherein the eMBB user terminal device divisionally executes, with regard to the task information, local computing of locally processing an input data size of the task information and remote computing of remotely processing the determined offload bit in the MEC server.

10. The macro base station according to claim 9, wherein the resource allocator calculates a communication resource block to be processed with the local computing in consideration of at least one of a total data size of the input data, a total CPU operation period, an execution time of a user terminal device for calculating one bit and the determined offload bit, and allocates the calculated communication resource block to at least one of the plurality of user terminal devices.

11. The macro base station according to claim 1, wherein the resource allocator allocates the communication resource block for processing remaining input data, except for the determined offload bit, among the input data to at least one of the plurality of user terminal devices.

12. The macro base station according to claim 1, wherein the MEC server processes the determined offload bit and the additionally determined offload bit using the allocated calculation resource block to secure quality of service (QoS) of the plurality of user terminal devices.

13. A method of operating a macro base station, the method using a Mobile Edge Computing (MEC) server and constructing energy-efficient communication and computation resource allocation framework for multiple communication services, the method comprising:

determining, according to task information of a plurality of user terminal devices, an offload bit among input data sizes of the task information by an offload determiner;

allocating a communication resource block to the plurality of user terminal devices based on the determined offload bit by a resource block allocator;

puncturing the allocated communication resource block by a resource block puncturer when Ultra-Reliable Low-Latency Communication (URLLC) traffic overlaps the allocated communication resource block; and calculating a calculation resource block for processing an offload bit additionally determined in relation to the punctured communication resource block, and allocating the calculated calculation resource block to the MEC server so as to process the determined offload bit and the additionally determined offload bit, by a computation resource allocator.

14. The method according to claim 13, further comprising collecting at least one of Channel State Information (CSI) related to the task information, central processor operation period information and task delay limit information for processing one bit of data among the input data sizes, and central processor capacity information from the plurality of user terminal devices by an information collector.

* * * * *